July 30, 1957 J. J. RUSSELL 2,800,923
MIXING VALVE
Filed April 21, 1953

INVENTOR.
JOHN J. RUSSELL.
BY
Louis V. Lucia
ATTORNEY.

United States Patent Office 2,800,923
Patented July 30, 1957

2,800,923

MIXING VALVE

John J. Russell, Bellerose, N. Y.

Application April 21, 1953, Serial No. 350,157

3 Claims. (Cl. 137—636.2)

This invention relates to a mixing valve and more particularly to a valve whereby hot and cold water may be mixed to produce a mixture of a desired temperature ranging between all hot water and all cold water and delivered in any desired amounts between the minimum and maximum flow capacity of the faucet.

An object of this invention is to provide such a faucet of a novel construction which is highly efficient in its operation, durable and trouble-free.

A further object of this invention is to provide such a faucet which may be produced economically due to the elimination of close fits and tolerances which are rendered unnecessary by my novel improved construction.

Further objects and advantages of this invention will be more clearly understood from the following description and the accompanying drawings in which.

Figure 1:
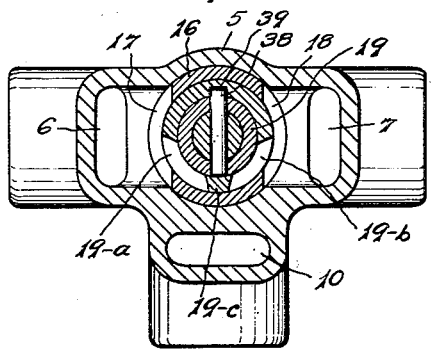
Fig. 1 is a sectional plan view of my improved mixing valve on line 1—1 of Fig. 2.
Figure 2:
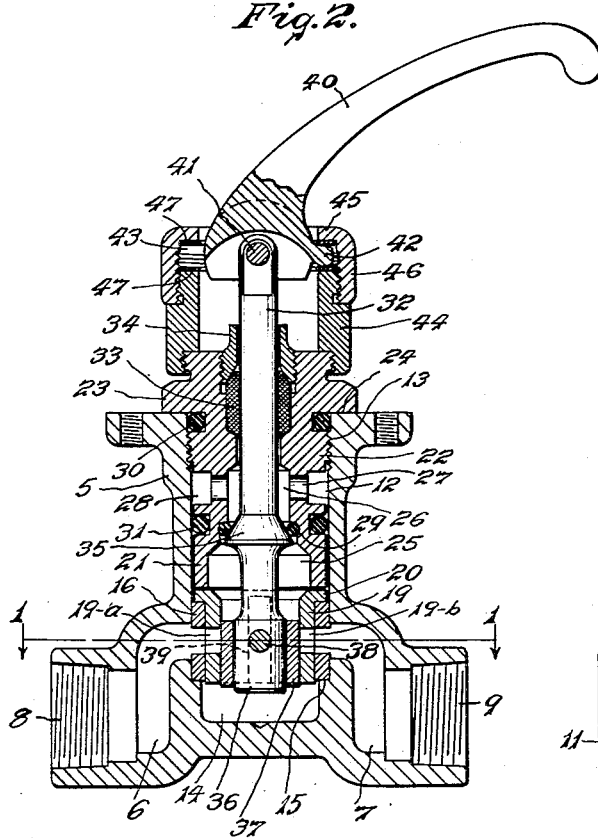
Fig. 2 is a sectional front view of said valve.
Figure 3:
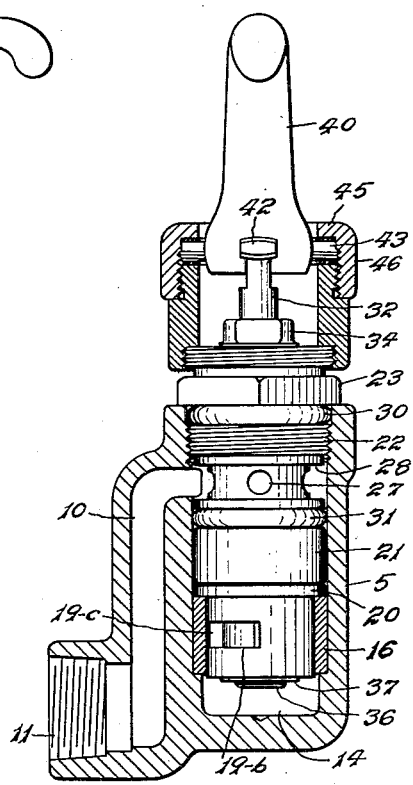
Fig. 3 is a sectional side view with parts thereof being shown in elevation.

In the embodiment of the present invention which is illustrated in the accompanying drawings, the numeral 5 denotes a housing having hot and cold water passages 6 and 7, respectively, which communicate with suitable threaded openings 8 and 9, respectively, to which may be threaded water supply pipes, and a discharge passage 10 communicating with a threaded discharge opening 11 to which may be connected a discharge pipe or faucet.

The said housing is provided with a cylindrical bore 12 which communicates with the passages 6 and 7 and has a threaded portion 13 and a reduced portion 14 that forms a shoulder 15 on the wall of said bore.

A bushing 16, of a durable rust-proof material, is fitted within said bore against the shoulder 15 and is preferably secured to the casing by being sweated thereto to prevent movement of the bushing relatively to the housing. The said bushing is provided with hot and cold water ports 17 and 18, respectively, which are in register with the passages 6 and 7, respectively.

A valve sleeve 19 is rotatable within the bushing 16 and has an annular flange 20 which extends over the end of the said bushing for rotatably positioning the valve sleeve relatively thereto. The said valve sleeve is provided with hot and cold water ports 19–a and 19–b, respectively, which are located at one side of a plane extending across the axis of the sleeve and are separated by means of an intermediate wall portion 19–c. A valve body 21 is also fitted within the bore 12 and has a threaded portion 22, by means of which it is threaded to the housing, and a head portion 23 providing a stop shoulder 24 which engages the housing to position the said valve body relatively thereto.

The lower end of the body 21 is located adjacent to the flange 20 of the valve sleeve 19 to rotatably retain the said valve sleeve against axial movement relatively to the bushing 16 and the said body 21 has an axial bore 25 therein providing a mixing chamber that extends into the interior of the valve sleeve 19. The bore 25 has a reduced portion 26 which communicates with the outlet passage 10 in the housing through radial openings 27 and an annular groove 28 that surrounds the said body 21.

A valve seat 29 is provided between the bore portion 26 and the said mixing chamber, for the purpose to be hereinafter described, and the said valve seat is preferably provided with a suitable sealing ring as shown and similar sealing rings 30 and 31 are provided between the valve body 21 and the wall of the bore 12 to prevent water leakage past the said body.

A valve stem 32 is slidable in the body 21 through a suitable packing which includes a gland 33 and a nut 34. The said stem has a tapered valve portion 35, which cooperates with the valve seat 29, and an extension 36 to which there is secured a valve piston 37 that is axially slidable within the valve sleeve 19 and secured to said extension by means of a cross-pin 38 which preferably projects through the said valve piston 37 and extends into a groove 39 in the inner wall of the sleeve 19 to slidably secure the extension 36 to the said valve sleeve and against rotation relatively thereto.

Upon the upper end of the stem 32 there is provided an operating lever 40 which is pivotally connected thereto by the cross-pin 41 and fulcrumed by means of a projecting finger 42 that extends into and is movable within an annular groove 43 which is provided between a supporting sleeve 44, which is preferably threaded to the upper end of the valve body 21, and an inwardly extending flange 45 of a nut 46 which is threaded to the said sleeve 44. The said groove 43 preferably contains a pair of washers 47—47 providing bearing surfaces for the opposite sides of the fulcrum finger 42.

Assuming that my improved mixing valve is connected to hot and cold water supplies and to a discharge faucet in the conventional manner and that the parts thereof are in the position shown in the drawings, the operation of said mixing valve is as follows:

The hot and cold water will flow through the passages 6 and 7, respectively, and enter the ports 17 and 18 and the ports 19–a and 19–b. Since the piston 37 is interposed between the said ports, the hot and cold water will be separated from each other by means of the intermediate wall portion 19–c so that neither will bypass the said piston.

When it is desired to provide a flow of water through my improved valve, the lever 40 is raised. This will cause the said lever to swing on the projecting fulcrum finger 42 and push the stem 32 downwardly; thus separating the valve portion 35 from the valve seat 29 and lowering the valve piston 37 so as to open the ports 17 and 18 to the mixing chamber within the sleeve 19 and the bore 25. The hot and cold water may then be mixed in the proper proportions to produce a mixture of a desired temperature by rotating the lever 40 and thereby rotating the valve sleeve 19 and causing closing of the port 17 and corresponding opening of the port 18, or vice versa, until the desired temperature is obtained.

The volume of flow of the said mixture may be regulated by lowering or raising the lever 40 and thereby applying a corresponding movement to the valve piston 37 relatively to the ports 19–a and 19–b in the valve sleeve 19.

It will be understood that, as the water is mixed within the mixing chamber, it will flow upwardly past the valve seat 29 and through the bore portion 26, openings 27 and the annular groove 28 into the discharge passage 10.

When it is desired to shut off the flow of water, the handle 40 is merely swung downwardly and this will raise the valve portion 35 against the valve seat 29 and prevent any leakage of water into the discharge passage 10.

It will be also understood that after my improved valve has been regulated, as above described, to supply the proper proportion of hot and cold water for a mixture of a desired temperature, the quantity of flow of said mixture may be controlled, or shut off, or turned on, without causing a change in the proportions of the water previously selected, by simply raising or lowering the lever 40.

I claim:

1. A mixing valve including a housing having a bore therein and passages communicating with said bore, a valve sleeve rotatable in said bore and disposed between two of said passages, the said valve sleeve having ports through the wall thereof adapted to communicate with the said passages, a body member contained within said bore and having a free end portion rotatably positioning the valve sleeve between said passages, a shoulder on said body member abutting said housing to position the said free end, the said body member having a bore with an enlarged portion forming a portion of a mixing chamber in said valve which extends into the interior of the rotatable valve sleeve, a reduced portion in said bore of the body member communicating through radial openings in the said member with a separate passage in the housing, a valve seat between the enlarged and reduced portions of said body member, a stem slidable through said body member and having an enlarged portion cooperating with said valve seat, a piston on said stem axially slidable within the valve sleeve and secured against rotation relatively thereto, and a pivotally and rotatably mounted operating lever for sliding and rotating said stem to slide the piston in the valve sleeve and open and close the ports therein and to rotate said valve sleeve for variably controlling the flow of water through said ports and into the mixing chamber.

2. A mixing valve including a housing having a bore therein and passages communicating with said bore, a valve sleeve rotatable in said bore and disposed between the said passages, a body member extending into the said bore and having a free end portion rotatably retaining said valve sleeve in position within the housing, the said body member having a bore with an enlarged portion forming a mixing chamber extending into the interior of the valve sleeve and a reduced portion extending from said enlarged portion, a shut-off valve between said enlarged and reduced portions including a seat in said body member, radial openings extending from said reduced portion and communicating with an annular groove at the exterior of the body member, a separate passage in the housing communicating with the said annular groove, a stem axially movable through said body member, a piston sleeve secured to the end of said stem and axially movable within the valve sleeve to open and close the ports therein, means slidably securing the stem to the valve sleeve and against rotation relatively thereto, a valve portion on said stem cooperating with the valve seat, and sealing means between the body member and the casing for preventing liquid from bypassing said shut-off valve from the mixing chamber to the annular groove.

3. A mixing valve including a housing having a bore therein and passages communicating with said bore, a valve sleeve rotatable in said bore and disposed between two of said passages, the said valve sleeve having ports through the wall thereof adapted to communicate with the said passages, a body member contained within said bore and having a free end portion rotatably position the valve sleeve between said passages, a shoulder on said body member and a cooperating abutment on said housing for positioning the said free end portion, the said body member having a bore with an enlarged portion forming a a portion of a mixing chamber in said valve which extends into the interior of the rotatable sleeve, a reduced portion in said bore of the body member communicating with radial openings in the body member, a valve seat between the enlarged and reduced portions of the said bore of the body member, a stem slidable through said body member, a valve portion on said stem cooperating with said valve seat, a piston on said stem axially slidable within the valve sleeve and secured against rotation relatively thereto, and a pivotally and rotatably mounted operating lever for sliding and rotating said stem to slide the piston in the valve sleeve and thereby open and close the ports therein and to rotate said valve sleeve for variably controlling the flow of water through said ports and into the mixing chamber.

References Cited in the file of this patent

UNITED STATES PATENTS

| | | |
|---|---|---|
| 499,231 | Kaeferle | June 13, 1893 |
| 742,327 | Huye | Oct. 27, 1903 |
| 1,485,957 | Bridgham | Mar. 4, 1924 |
| 1,577,355 | Palfy | Mar. 16, 1926 |
| 1,882,953 | Saelzler | Oct. 18, 1932 |
| 2,301,439 | Moen | Nov. 10, 1942 |
| 2,428,410 | Daniels | Oct. 7, 1947 |
| 2,596,464 | Bauberger | May 13, 1952 |
| 2,604,904 | Flanagan | July 29, 1952 |
| 2,609,206 | Moen | Sept. 2, 1952 |
| 2,653,793 | St. Clair | Sept. 29, 1953 |